Patented Mar. 20, 1928.

1,663,082

UNITED STATES PATENT OFFICE.

HARRY W. HOUGHTON, OF GLEN ECHO, MARYLAND, ASSIGNOR TO SAFETY FUMIGANT COMPANY, OF BOSTON, MASSACHUSETTS, A CORPORATION OF MASSACHUSETTS.

FUMIGANT MATERIAL AND PACKAGE.

No Drawing. Application filed June 25, 1925. Serial No. 39,614.

This invention relates to fumigants of the type comprising a lethal gas and a lachrymatory gas, or a gas which is both lethal and lachrymatory, and aims to provide a convenient and safe means for transporting and using the same. The invention consists in an improved assemblage of ingredients for generating the gas at the place of use with safety and convenience, and for storage and transportation prior to use without danger from fumes or handling.

In utilizing a fumigant gas, such, for example, as the cyanogen haloid (preferably chloride) and hydrocyanic acid gas described in my Patent No. 1,521,537, dated December 30, 1924, for fumigant and process of fumigation, difficulty has been experienced in generating the gas at the place of use, due to the dangerous nature of the materials and violent character of the reaction if not properly controlled; and it has been found impracticable to generate the gas at a distance and transport it to the place of use in containers, such as pressure cylinders, because of the propensity of the gas to polymerization and decomposition into cyanuric haloid, which is not a fumigant.

I have found that the difficulties and dangers attending the generation of the gas at the place of use may be lessened by mixing the sodium cyanide and sodium chlorate or other cyanide, haloid or oxidizing agent used with a suitable binder and forming the mixture into a briquette.

The binding material or matrix is preferably a self hardening plastic easily decomposed by hydrochloric acid. Anhydrous sodium carbonate or other solid material having a low fusing point, or a mixture of cementitious substances, such as flour paste and saw-dust, or lime or gypsum cement mixed with sand and water, and chemically inert in the sense that it is free from chemicals or impurities tending to react with the cyanide or oxidizing agent to set free hydrocyanic acid gas, may be used with successful results.

It is advantageous to protect the briquette from air and moisture by coating it with paraffine or wax paper that can be readily removed prior to use, or by covering it with a metallic foil or a container that will be dissolved by dilute hydrochloric acid.

A suitable matrix is prepared by mixing one part of lime with three parts of sand, slacking the mixture with water, and adding five parts of sand and enough water to make it semi-plastic. To this mixture are added the chemicals, preferably in the proportions of eight parts of sodium cyanide and four parts of sodium chlorate. No special preparation of these materials is required other than cracking the cyanide into small bits if procured in cake form. It is advantageous to add a few grams of common salt to accelerate the setting of the briquettes, which harden upon setting without application of pressure. Such a briquette does not deliquesce or give off fumes of hydrocyanic acid when exposed to air and moisture, and liberates the fumigant gas mixture freely when reacted upon by hydrochloric acid.

A briquette or cake containing two ounces of sodium cyanide will require for its conversion into gas about nine ounces of hydrochloric acid and an equal volume of water, and will generate gas enough to fumigate five hundred cubic feet of space.

Such a cake may be handled without danger, and when exposed to the mixture of acid and water it will react very slowly at first until the temperature of the water rises to over 100° F., which takes several minutes. This slowness in starting is advantageous, because it permits the user to get away to a safe distance after starting the operation.

Other advantages, such as the safety, ease and rapidity with which the gas can be generated at the place of use, and the cheapness of the materials used, commend the invention.

Without restricting myself to the particular ingredients and proportions mentioned, what I claim and desire to secure by Letters Patent is as follows:

1. A caked mixture of a cyanide and an oxidizing agent with a protective binder not affected by moisture in proportions to produce a lachrymatory fumigant gas by the addition of dilute hydrochloric acid.

2. A caked mixture containing sodium cyanide and a chlorate with a matrix of self hardening plastic material for the purpose described.

3. A caked mixture containing sodium cyanide and sodium chlorate with a matrix of inert binding material in proportions to produce a lachrymatory fumigant gas when acted upon by hydrochloric acid.

4. A cake for producing hydrocyanic acid gas and cyanogen chloride in lachrymatory proportions for fumigant purposes comprising a cyanide and a chlorate of an alkali metal mixed with slacked lime and sand in plastic condition and allowed to harden.

5. A cake for producing hydrocyanic acid gas and cyanogen chloride in lachrymatory proportions for fumigant purposes comprising a cyanide and a chlorate of an alkali metal mixed with slacked lime and sand in plastic condition with the addition of a small amount of common salt and allowed to harden.

6. A hardened cake of plastic material in the following proportions; freshly slacked lime one part, sand eight parts, sodium cyanide eight parts, and sodium chlorate four parts, the whole mixed with water to form a plastic mass and dried.

7. A hardened cake of plastic material comprising a cyanide and an oxidizing agent in proportions to form hydrocyanic acid gas and halogen cyanide when treated with hydrochloric acid for the purpose described.

8. A ready prepared caked mixture in briquette form containing an inert binder, a cyanide and an oxidizing agent in standard amounts to fumigate a desired volumetric space when acted on by dilute hydrochloric acid.

9. A ready prepared package comprising a container easily dissoluble in dilute hydrochloric acid and holding a mixture of a preponderant quantity of cyanide and a lesser quantity of an oxidizing agent to produce HCN and CnCl in standard amounts to fumigate a desired volumetric space when acted upon by said acid.

In testimony whereof, I have signed my name to this specification.

HARRY W. HOUGHTON.